(12) United States Patent
Jeon

(10) Patent No.: US 12,151,592 B2
(45) Date of Patent: Nov. 26, 2024

(54) BRAKE SYSTEM

(71) Applicant: HL MANDO CORPORATION, Pyeongtaek-si (KR)

(72) Inventor: Nam Ju Jeon, Seoul (KR)

(73) Assignee: HL MANDO CORPORATION, Pyeongtaek-si (KR)

(*) Notice: Subject to any disclaimer, the term of this patent is extended or adjusted under 35 U.S.C. 154(b) by 931 days.

(21) Appl. No.: 17/056,169

(22) PCT Filed: May 17, 2019

(86) PCT No.: PCT/KR2019/005938
§ 371 (c)(1),
(2) Date: Nov. 17, 2020

(87) PCT Pub. No.: WO2019/221554
PCT Pub. Date: Nov. 21, 2019

(65) Prior Publication Data
US 2021/0213836 A1 Jul. 15, 2021

(30) Foreign Application Priority Data
May 17, 2018 (KR) .......................... 10-2018-0056491

(51) Int. Cl.
*B60T 13/58* (2006.01)
*B60L 7/10* (2006.01)
(Continued)

(52) U.S. Cl.
CPC ...... *B60L 7/26* (2013.01); *B60L 7/10* (2013.01); *B60T 8/17* (2013.01); *B60T 8/1755* (2013.01);
(Continued)

(58) Field of Classification Search
CPC ............... B60T 13/586; B60T 2270/60; B60T 2270/6504; B60T 8/17; B60T 8/1755;
(Continued)

(56) References Cited

U.S. PATENT DOCUMENTS 5,433,512 A * 7/1995 Aoki ..................... B60T 8/267
303/3
6,070,953 A * 6/2000 Miyago .................... B60L 7/26
701/72
(Continued)

FOREIGN PATENT DOCUMENTS

KR  10-2011-0023975 A   3/2011
KR     10-1269927 B1    5/2013
(Continued)

OTHER PUBLICATIONS

Korean Office Action issued on Jun. 10, 2019, in connection with the Korean Patent Application No. 10-2018-0056491.
(Continued)

*Primary Examiner* — Bradley T King
(74) *Attorney, Agent, or Firm* — Hauptman Ham, LLP

(57) ABSTRACT

A brake system comprises a hydraulic braking device configured to generate a hydraulic braking force; and a regenerative braking device configured to generate a regenerative braking force by an electric motor; wherein the hydraulic braking device comprises a master cylinder configured to generate a hydraulic pressure corresponding to a displacement amount of a brake pedal by discharging a brake oil; a plurality of valves disposed in a flow path connecting a plurality of wheel cylinders and the master cylinder; an accumulator disposed in the flow path; and an electronic control unit (ECU) configured to control the plurality of valves so that the brake oil discharged from the master cylinder is stored in the accumulator, and to transmit a request signal for generating the regenerative braking force to the regenerative braking device.

12 Claims, 13 Drawing Sheets

(51) Int. Cl.
    *B60L 7/26* (2006.01)
    *B60T 8/17* (2006.01)
    *B60T 8/1755* (2006.01)
    *B60T 8/176* (2006.01)
    *B60T 8/32* (2006.01)
    *B60T 13/14* (2006.01)
    *B60T 13/68* (2006.01)

(52) U.S. Cl.
    CPC .............. *B60T 8/176* (2013.01); *B60T 8/321* (2013.01); *B60T 13/142* (2013.01); *B60T 13/586* (2013.01); *B60T 13/686* (2013.01); *B60T 2250/04* (2013.01); *B60T 2270/10* (2013.01); *B60T 2270/30* (2013.01); *B60T 2270/604* (2013.01)

(58) Field of Classification Search
    CPC ........ B60T 8/176; B60T 8/321; B60T 13/142; B60T 13/686; B60T 2250/04; B60T 2270/30; B60L 7/10; B60L 7/26
    See application file for complete search history.

(56) References Cited

U.S. PATENT DOCUMENTS

| | | | | |
|---|---|---|---|---|
| 6,086,166 | A * | 7/2000 | Fukasawa | B60T 8/17636 |
| | | | | 303/122.04 |
| 6,910,747 | B2 * | 6/2005 | Tsunehara | B60T 8/267 |
| | | | | 303/3 |
| 8,303,046 | B2 * | 11/2012 | Nakata | B60W 10/184 |
| | | | | 303/122.1 |
| 2007/0018499 | A1 * | 1/2007 | Kokubo | B60L 7/14 |
| | | | | 303/151 |
| 2007/0228821 | A1 * | 10/2007 | Maki | B60W 10/04 |
| | | | | 303/151 |
| 2007/0296264 | A1 | 12/2007 | Haupt et al. | |
| 2012/0139930 | A1 | 6/2012 | Morishita | |
| 2012/0299367 | A1 * | 11/2012 | Ross | B60T 8/4872 |
| | | | | 303/3 |
| 2013/0134767 | A1 * | 5/2013 | Hakiai | B60W 10/08 |
| | | | | 303/3 |
| 2013/0169032 | A1 * | 7/2013 | Linhoff | B60T 13/148 |
| | | | | 303/3 |
| 2015/0202965 | A1 * | 7/2015 | Gabor | B60L 7/18 |
| | | | | 701/70 |

FOREIGN PATENT DOCUMENTS

| | | |
|---|---|---|
| KR | 10-1371898 B1 | 3/2014 |
| KR | 10-2016-0039823 A | 4/2016 |

OTHER PUBLICATIONS

International Search Report issued Sep. 11, 2019, corresponding to International Application No. PCT/KR2019/005938.

Office Action issued on Sep. 18, 2023, for corresponding Korean Patent Application No. 10-2020-7032928, along with an English machine translation (14 pages).

* cited by examiner

FIG. 4

| Actuator | | Normal | BRAKING MODE | | | |
|---|---|---|---|---|---|---|
| | | | ① | ② | ③ | ④ |
| | | | REGENERATIVE INITIAL MODE | REGENERATIVE COOPERATION MODE | REGENERATIVE FADEOUT MODE | REGENERATIVE RELEASE MODE |
| Valve | IN (NO) | Open | Open | Open | Open | Open |
| | OUT (NC) | Close | Open | Close | Close | Close |
| | TC (NO) | Open | Open | Open | Close | Close |
| | ESV (NC) | Close | Close | Close | Close | Close |
| HP | | OFF | OFF | OFF | ON | OFF |
| LPA | | Empty | Filling | Filled | Residual | Residual/Empty |

BRAKE SYSTEM

CROSS-REFERENCE TO RELATED APPLICATION

This present application is a national stage filing under 35 U.S.C. § 371 of PCT application number PCT/KR2019/005938 filed on May 17, 2019 which is based upon and claims the benefit of priority to Korean Patent Application No. 10-2018-0056491 filed May 17, 2018 in the Korean Intellectual Property Office. The disclosures of the above-listed applications are hereby incorporated by reference herein in their entireties.

TECHNICAL FIELD

The present disclosure relates to a brake system capable of performing regenerative braking using an electric motor even in a hydraulic braking device.

BACKGROUND ART

Most regenerative braking control systems using electric motors are applied only to vehicles equipped with electronic braking devices.

However, there is no known technique for regenerative braking control in the vehicle equipped with a hydraulic braking device (e.g., electronic stability control (ESC), anti-lock brake system (ABS), etc.) that cannot control a braking force without a driver's braking intent.

DISCLOSURE

Technical Problem

The present disclosure is directed to providing a brake system for performing regenerative braking using an electric motor even in a vehicle to which a hydraulic braking device is applied.

Technical Solution

An aspect of the disclosure provides a brake system including: a hydraulic braking device configured to generate a hydraulic braking force; and a regenerative braking device configured to generate a regenerative braking force by an electric motor. The hydraulic braking device may include a master cylinder configured to generate a hydraulic pressure corresponding to a displacement amount of a brake pedal by discharging a pressurized medium; a plurality of valves disposed in a flow path connecting a plurality of wheel cylinders and the master cylinder; an accumulator disposed in the flow path; and an electronic control unit (ECU) configured to determine a required braking force corresponding to the displacement amount of the brake pedal, and to control the plurality of valves. When the displacement amount of the brake pedal is detected, the ECU may be configured to control the plurality of valves so that the pressurized medium discharged from the master cylinder is stored in the accumulator, and to transmit a request signal for generating the regenerative braking force to the regenerative braking device.

The plurality of valves may include an outlet valve disposed on an outlet side of the plurality of wheel cylinders. The ECU may be configured to store the pressurized medium discharged from the master cylinder in the accumulator by switching the outlet valve to an open state.

The ECU may be configured to control the plurality of valves such that the pressurized medium stored in the accumulator is transmitted to the plurality of wheel cylinders when a vehicle speed is equal to or less than a predetermined reference value.

The plurality of valves may include a traction control valve disposed between the master cylinder and the wheel cylinders. The ECU may be configured to transmit the pressurized medium stored in the accumulator to the plurality of wheel cylinders by switching the traction control valve to a closed state.

The brake system may further include a hydraulic pump configured to provide the pressurized medium stored in the accumulator to the plurality of wheel cylinders; and a motor configured to drive the hydraulic pump. The ECU may be configured to transmit the pressurized medium stored in the accumulator to the plurality of wheel cylinders by turning on the hydraulic pump and the motor.

The ECU may be configured to switch an outlet valve to an open state when the displacement amount of the brake pedal is greater than or equal to a predetermined threshold value.

The ECU may be configured to switch an outlet valve to a closed state before the regenerative braking force corresponding to the required braking force reaches a maximum regenerative braking force.

The ECU may be configured to determine a mode switching regenerative braking force based on the maximum regenerative braking force, and to switch the outlet valve to the closed state when the regenerative braking force corresponding to the required braking force reaches the determined mode switching regenerative braking force.

The ECU may be configured to determine a value obtained by applying a predetermined weight to the maximum regenerative braking force as the mode switching regenerative braking force. The predetermined weight is greater than 0 and less than or equal to 1.

The ECU may be configured to determine a target regenerative braking force based on the required braking force, and to transmit the request signal to the regenerative braking device such that the determined target regenerative braking force is generated.

The ECU may be configured to determine a braking force obtained by subtracting the hydraulic braking force from the required braking force as the target regenerative braking force.

Another aspect of the present disclosure provides a brake system including: a hydraulic braking device configured to generate a hydraulic braking force; and a regenerative braking device configured to generate a regenerative braking force by an electric motor. The hydraulic braking device may include a master cylinder configured to generate a hydraulic pressure corresponding to a displacement amount of a brake pedal by discharging a pressurized medium; an outlet valve provided on an outlet side of the plurality of wheel cylinders; a traction control valve provided between an inlet valve provided on an inlet side of the plurality of wheel cylinders and the master cylinder; an accumulator connected to the outlet valve; and an electronic control unit (ECU) configured to determine a required braking force corresponding to the displacement amount of the brake pedal, and to control a plurality of valves. When the displacement amount of the brake pedal is detected, the ECU may be configured to control the outlet valve so that the pressurized medium discharged from the master cylinder is stored in the accumulator, and to control the traction control valve such that the pressurized medium stored in the accumulator is transmitted to the plurality of wheel cylinders when a vehicle speed is equal to or less than a predetermined reference value.

The ECU may be configured to store the pressurized medium discharged from the master cylinder in the accumulator by switching the outlet valve to an open state.

The ECU may be configured to transmit the pressurized medium stored in the accumulator to the plurality of wheel cylinders by switching the traction control valve to a closed state when the vehicle speed is equal to or less than the predetermined reference value.

The ECU may be configured to switch an outlet valve to an open state when the displacement amount of the brake pedal is greater than or equal to a predetermined threshold value.

The ECU may be configured to switch an outlet valve to a closed state before the regenerative braking force corresponding to the required braking force reaches a maximum regenerative braking force.

The ECU may be configured to determine a mode switching regenerative braking force based on the maximum regenerative braking force, and to switch the outlet valve to the closed state when the regenerative braking force corresponding to the required braking force reaches the determined mode switching regenerative braking force.

The ECU may be configured to determine a target regenerative braking force based on the required braking force, and to transmit the request signal to the regenerative braking device such that the determined target regenerative braking force is generated.

Another aspect of the present disclosure provides a brake system including: a hydraulic braking device configured to generate a hydraulic braking force; and a regenerative braking device configured to generate a regenerative braking force by an electric motor. The hydraulic braking device may be configured to determine a difference between the required braking force determined according to the displacement amount of the brake pedal and the hydraulic braking force as a target regenerative braking force, and to transmit a request signal for generating the determined target regenerative braking force to the regenerative braking device.

Advantageous Effects

According to the above-described brake system, regenerative braking can be performed even in a vehicle to which the hydraulic braking device is applied, and the hydraulic braking force loss due to the difference in an amount of liquid required compared to the electronic braking device of the hydraulic braking device can be compensated by a regenerative braking force, thereby improving a total braking force.

DESCRIPTION OF DRAWINGS

FIG. 4 is a view illustrating the operation and state of a valve, a hydraulic pump, and a low pressure accumulator during braking of a brake system according to an embodiment.

MODES OF THE INVENTION

Figure 1:
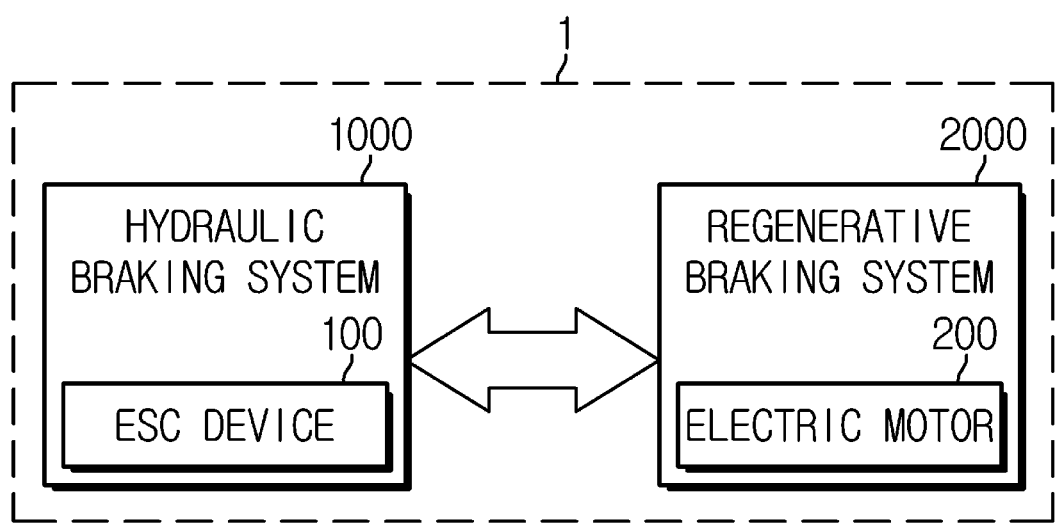
FIG. 1 is a simplified conceptual view of a brake system according to an exemplary embodiment.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not be shown to clearly describe the present disclosure, and like numbers refer to like elements throughout this specification.

FIG. 1 is a simplified conceptual view of a brake system according to an exemplary embodiment.

Referring to FIG. 1, a brake system 1 may include a hydraulic braking system 1000 and a regenerative braking system 2000.

The hydraulic braking system 1000 may perform braking of a vehicle by providing a hydraulic braking force. A hydraulic braking device 10 of the hydraulic braking system 1000 may be arranged to generate and provide the hydraulic braking force except for a regenerative braking force by an electric motor 200 from a required braking force based on an amount of brake pedal effort or displacement of a driver.

The hydraulic braking device 10 may include an electronic stability control (ESC) device 100.

The ESC device 100 may calculate a driver's required braking force based on a pressure of a master cylinder or the amount of brake pedal effort or displacement.

Particularly, the ESC device 100 may include an electronic control unit (ECU) 11, and the ECU 11 may determine the braking force except for the regenerative braking force by the electric motor 200 as the hydraulic braking force by a pressurized medium in the calculated driver's required braking force. In addition, the ECU 11 may generate a control signal for providing the hydraulic braking force to a wheel cylinder and transmit it to at least one component inside the hydraulic braking device 10.

In addition, the ESC device 100 may further include an anti-lock brake system (ABS).

A regenerative braking device 20 of the regenerative braking system 2000 may perform braking of the vehicle by providing the regenerative braking force. The regenerative braking device 20 of the regenerative braking system 2000 may include the electric motor 200 that rotates the wheel of the vehicle with an electrical energy, and may perform regenerative braking by generating the regenerative braking force that may be generated by the electric motor 200. In this case, the electric motor 200 may drive the vehicle by providing power to wheels on which the wheel cylinders are mounted.

At the same time, when the vehicle is decelerated by braking, the electric motor 200 may convert a kinetic energy of the vehicle into the electrical energy by functioning as a generator, and store the converted electrical energy in a battery or a capacitor. When the kinetic energy of the vehicle is converted into the electrical energy by the electric motor 200, the braking force may be generated in each wheel, and the braking force may be called the regenerative braking force.

As a result, when a deceleration or braking command is generated from the driver, the braking force applied to all the wheels is the sum of the regenerative braking force by the electric motor 200 of the regenerative braking device 20 and the hydraulic braking force by the hydraulic braking device 10.

On the other hand, power generation by the electric motor 200 is possible even during brake operation. That is, a thermal energy to be dissipated as heat during brake operation may be generated by the electric motor 200 of the regenerative braking device 20. At this time, an amount of power that can be generated will vary depending on a speed of the vehicle and an amount of battery charge. Therefore, referring to the braking force required by the driver as the force of the regenerative braking force and the hydraulic braking force, in order to satisfy the driver's braking intent, the hydraulic braking device 10 may generate the hydraulic braking force of a size except for the regenerative braking force corresponding to an amount generated by the electric motor 200 from the braking force required by the driver.

In order to control a total braking force applied to the wheel cylinder of the vehicle, the hydraulic braking device 10 and the regenerative braking device 20 may transmit and receive various pieces of information for braking.

The hydraulic braking device 10 may transmit information related to the driver's required braking force to the regenerative braking device 20. In this case, the information related to the driver's required braking force may include the pressure of the master cylinder 101 (see FIG. 2) or the amount of brake pedal effort or displacement, and the driver's required braking amount such as the driver's required braking torque calculated therefrom, and the like.

In addition, the hydraulic braking device 10 may transmit various signals for controlling the regenerative braking device 20. In this case, the various signals for controlling the regenerative braking device 20 may include a regenerative braking request signal or a regenerative braking release signal for generating the regenerative braking force. The regenerative braking request signal may include at least one of information about regenerative braking requirements such as a target regenerative braking force, information about the total braking force corresponding to the driver's required braking force, information about the braking force except for the hydraulic braking force at the total braking force corresponding to the driver's required braking force, information about the regenerative braking force determined based on a maximum regenerative braking force.

The hydraulic braking device 10 may receive information about regenerative braking from the regenerative braking device 20. At this time, the information about regenerative braking may refer to information about an amount of regenerative braking, and may include the regenerative braking force, the maximum regenerative braking force, or a regenerative braking torque.

Meanwhile, a transmission of various information and signals to the regenerative braking device 20 may be performed by the ECU 11.

The regenerative braking device 20 may transmit the information about the regenerative braking to the hydraulic braking device 10 and perform the regenerative braking based on the signal received from the hydraulic braking device 10.

The hydraulic braking device 10 and the regenerative braking device 20 may transmit and receive information using various communication networks. For example, the hydraulic braking device 10 and the regenerative braking device 20 may transmit and receive information using a controller area network (CAN). However, the present disclosure is not limited thereto, and may use various wired or wireless communication networks such as a FlexRay, a Local Interconnect Network (LIN), a Media Oriented System Transport (MOST) based network, or an Ethernet based network.

On the other hand, the hydraulic braking device 10 and the regenerative braking device 20 may include a memory (not shown) storing an algorithm for controlling the operation of components of the regenerative braking system 2000 or data about a program that implements the algorithm, and a processor (not shown) carrying out the aforementioned operation using the data stored in the memory. The memory and the processor may be implemented in separate chips. Alternatively, the memory and the processor may be implemented in a single chip. For example, the ECU 11 of the hydraulic braking device 10 may be implemented to include the memory and the processor.

At least one component may be added or deleted corresponding to the performance of the components of the brake system 1 illustrated in FIG. 1. It will be readily understood by those skilled in the art that the mutual position of the components may be changed corresponding to the performance or structure of the system.

Furthermore, each of the components illustrated in FIG. 1 may be referred to as a hardware component such as software and/or a field programmable gate array (FPGA) and an application specific integrated circuit (ASIC).

Figure 2:
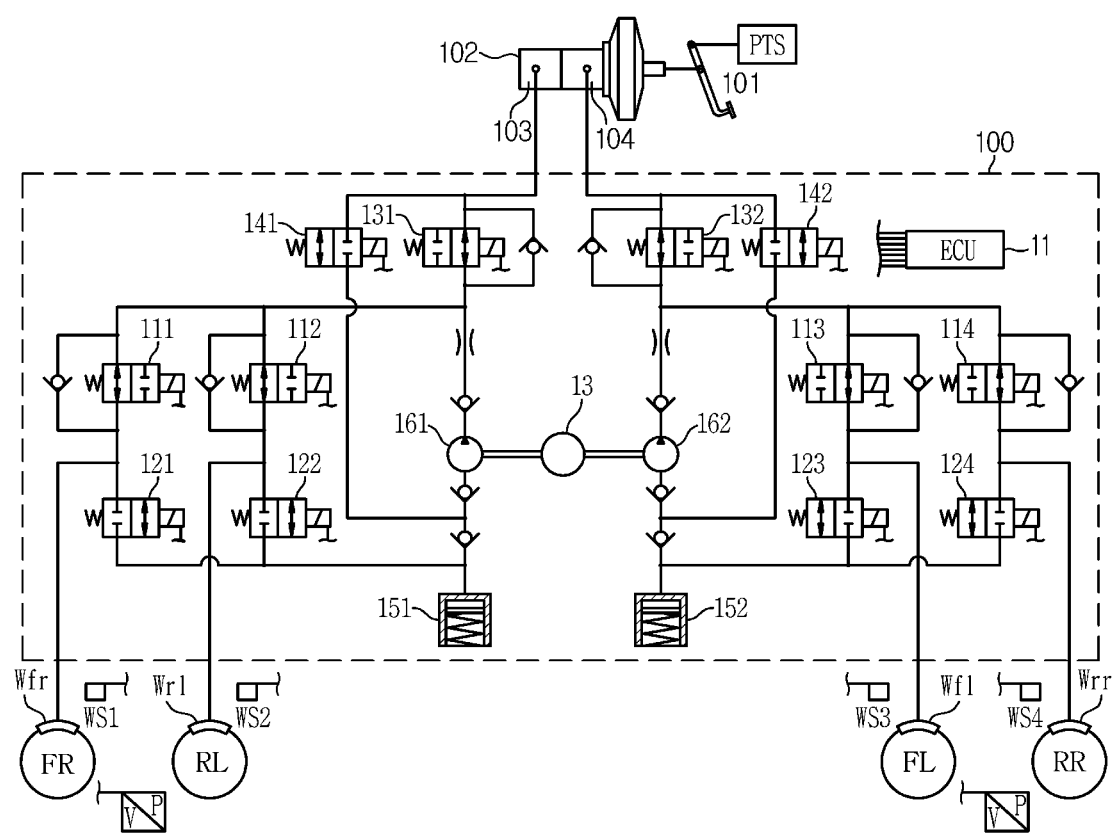
FIG. 2 is a hydraulic circuit diagram of a brake system according to an exemplary embodiment.

FIG. 2 is a hydraulic circuit diagram of a brake system according to an exemplary embodiment.

Referring to FIG. 2, the hydraulic braking device 10 of the brake system 1 may include a master cylinder 102 for generating a hydraulic pressure of a pressurized medium such as brake fluid by operating a booster by the pressure of the brake pedal 101 and a plurality of wheel cylinders Wfr, Wrl, Wfl, and Wrr connected to the master cylinder 102 through a plurality of hydraulic lines to receive the pressurized medium from the master cylinder 102.

The master cylinder 102 may have two chambers. A first chamber 103 of the master cylinder 102 may be connected to the wheel cylinders Wfr and Wrl installed on a front right wheel FR and a rear left wheel RL, respectively, and a second chamber 104 may be connected to the wheel cylinders Wfl and Wrr installed on a front left wheel FL and a rear right wheel RR.

A normal open traction control valve 131 may be provided in a hydraulic line between the first chamber 103 and the wheel cylinders Wfr and Wrl respectively installed in the front right wheel FR and the rear left wheel RL. The normal open traction control valve 131 may control the pressurized medium transmitted from the master cylinder 102 to the wheel cylinders Wfr and Wrl of the wheels FR and RL.

A normal open traction control valve 132 may be provided in a hydraulic line between the second chamber 104 and the wheel cylinders Wfl and Wrr respectively installed in the front left wheel FL and the rear right wheel RR. The normal open traction control valve 132 may control the pressurized medium transmitted from the master cylinder 102 to the wheel cylinders Wfr and Wrl of the wheels FL and RR.

Normal open inlet valves 111 and 112 may be provided in the hydraulic line between the normal open traction control valve 131 and the wheel cylinders Wfr and Wrl of each of the wheels FR and RL, and normal open inlet valves 113 and 114 may be provided in the hydraulic line between the normal open traction control valve 132 and the wheel cylinders Wfl and Wrr of the wheels FL and RR.

Normal close outlet valves 121 and 122 may be provided on the outlet side of the wheel cylinders Wfr and Wrl of the wheels FR and RL, and normal close outlet valves 123 and 124 may be provided on the outlet side of the wheel cylinders Wfl and Wrr of the wheels FL and RR.

At the outlet side of the normal close outlet valves 121 and 122, a low pressure accumulator 151 may be provided for temporarily storing the pressurized medium discharged from the wheel cylinders Wfr and Wrl of wheel FR and RL, and at the outlet side of the normal close outlet valves 123 and 124, a low pressure accumulator 152 may be provided for temporarily storing the pressurized medium discharged from the wheel cylinders Wfl and Wrr of the wheels FL and RR.

The pressurized medium stored in the low pressure accumulators 151 and 152 may be respectively pressurized by a pair of hydraulic pumps 161 and 162 and transmitted to each of the wheel cylinders Wfr, Wrl, Wfl, and Wrr. In this case, the pair of hydraulic pumps 161 and 162 may be provided with a driving force by a motor 13.

Normal close electronic shuttle valves 141 and 142 may be provided in an auxiliary hydraulic line between the suction side of the pair of hydraulic pumps 161 and 162 and each of the chambers 103 and 104 of the master cylinder 102. Accordingly, when the normal close electronic shuttle valves 141 and 142 are opened, the auxiliary hydraulic line between the master cylinder 102 and each of the hydraulic pumps 161 and 162 may be opened. When the electronic shuttle valves 141 and 142 are closed, the auxiliary hydraulic line between the master cylinder 102 and each of the hydraulic pumps 161 and 162 may be closed.

On the other hand, in a hydraulic circuit of the front left wheel FL and the rear right wheel RR, the respective components may be configured in the same way as the hydraulic circuit of the front right wheel FR and the rear left wheel RL.

A normal open (NO) valve described in the embodiment of FIG. 2 opens a valve flow path before energizing and closes the valve flow path when energized. A normal close (NC) valve closes the valve flow path before energizing and opens the valve flow path when energizing.

In FIG. 2, the normal open traction control valves 131 and 132), the normal close electronic shuttle valves 141 and 142, the normal open inlet valves 111 to 114, the normal close outlet valves 121 to 124, the motor 13 for operating the hydraulic pumps 161 and 162 may be operated by the ECU 11 which performs a braking mode.

Meanwhile, the traction control valves 131 and 132, the electronic shuttle valves 141 and 142, the inlet valves 111 and 114, and the outlet valves 121 and 124 may be implemented as the normal open valve or the normal close valve, but are not limited to the above examples.

Hereinafter, the traction control valves 131 and 132 may be implemented in normal open types, the electronic shuttle valves 141 and 142 may be implemented in normal close types, the inlet valves 111 to 114 may be implemented in the normal open types, and the outlet valves 121 to 124 may be implemented in the normal close types.

Wheel speed sensors WS1 to WS4 respectively provided at the front left and right wheels FL and FR and the rear left and right wheels RL and RR are electrically connected to the ECU 11 so as to provide wheel speed information of the detected wheels. The ECU 11 may receive the wheel speed information from the wheel speed sensors WS1 to WS4, and may use the wheel speed information as a control basis.

A pressure sensor P/V provided to detect the pressure of the master cylinder 102 and the pressure of each of the wheel cylinder (e.g., Wfr, Wfl) is electrically connected to the ECU 11 so as to provide the detected pressure information.

A pedal travel sensor PTS installed near the brake pedal 101 to identify the driver's braking intent is electrically connected to the ECU 11 so as to provide the detected brake pedal operation information.

The normal open traction control valves 131 and 132, the normal close electronic shuttle valves 141 and 142, the normal open inlet valves 111, 112, 113, and 114, the normal close outlet valves 121, 122, 123, and 124, the motor 13 for operating the hydraulic pumps 161 and 162 of the ESC device 100 may be controlled by the ECU 11. In addition, a plurality of pressure sensors for measuring a hydraulic pressure of the master cylinder 102 and the hydraulic pressure applied to at least one of the wheel cylinders FL, FR, RR, and RL may be disposed.

Figure 3:
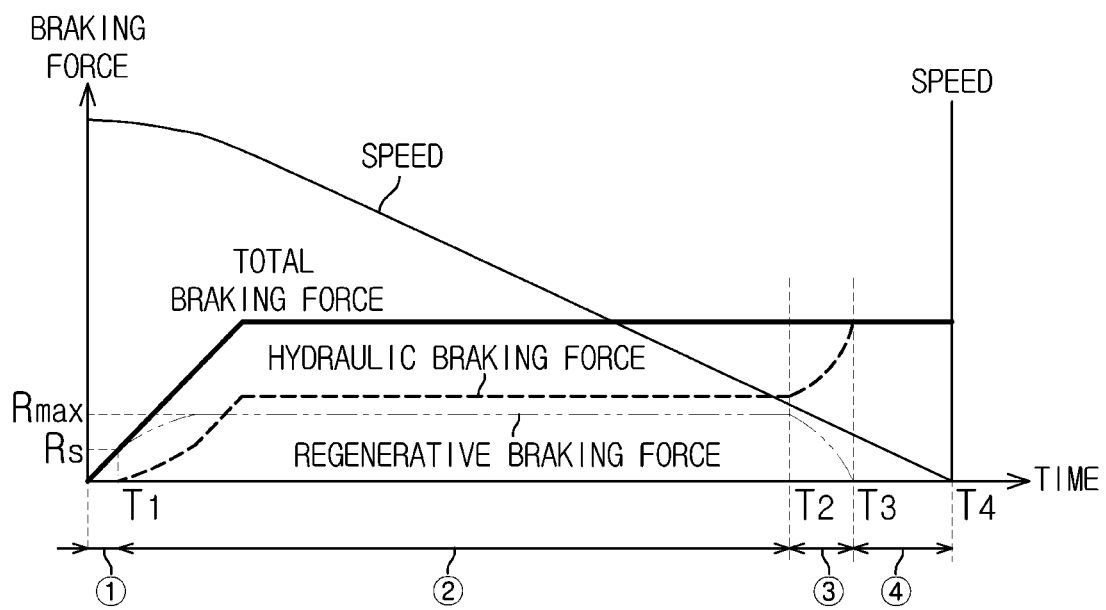
FIG. 3 is a graph illustrating a regenerative braking force and a hydraulic braking force during braking of a brake system according to an exemplary embodiment.
Figure 5A:
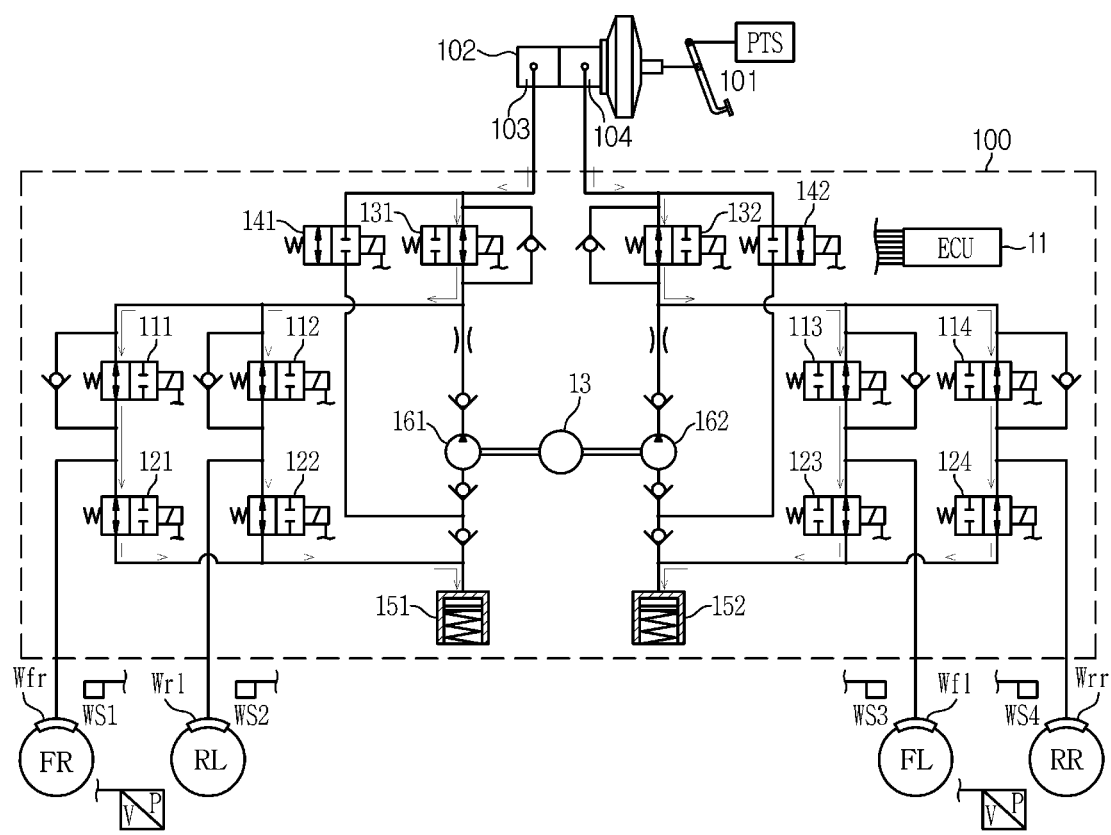
FIG. 5A is a hydraulic circuit diagram illustrating an operating state of a regenerative initial mode of a brake system according to an exemplary embodiment.
Figure 5B:
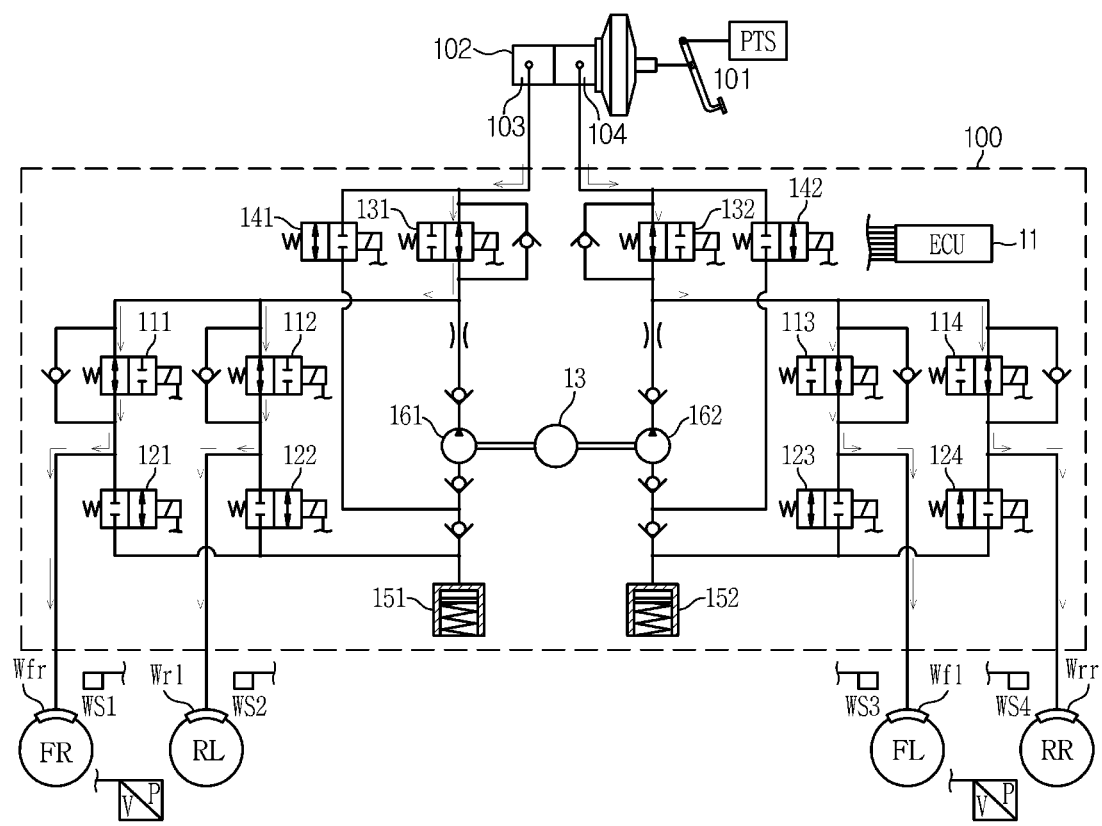
FIG. 5B is a hydraulic circuit diagram illustrating an operating state of a regenerative cooperation mode of a brake system according to an exemplary embodiment.
Figure 5C:
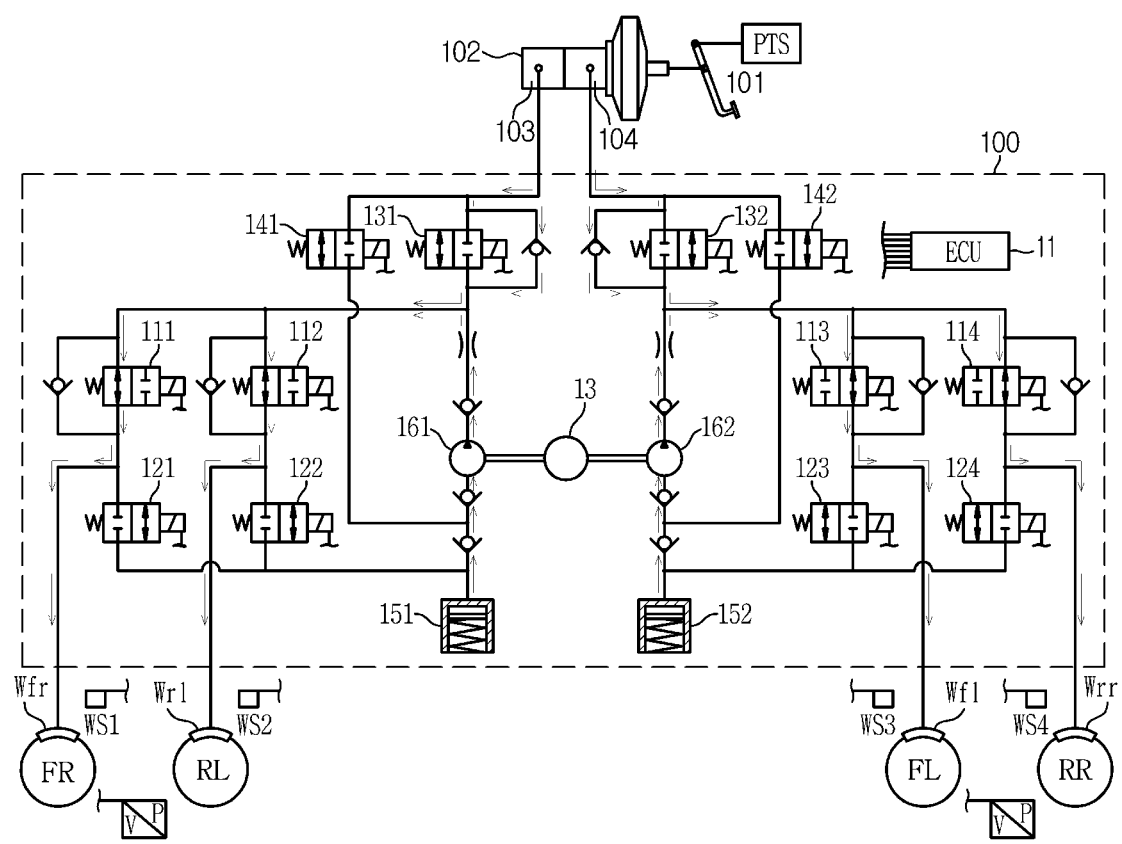
FIG. 5C is a hydraulic circuit diagram illustrating an operating state of a regenerative fadeout mode of a brake system according to an exemplary embodiment.
Figure 5D:
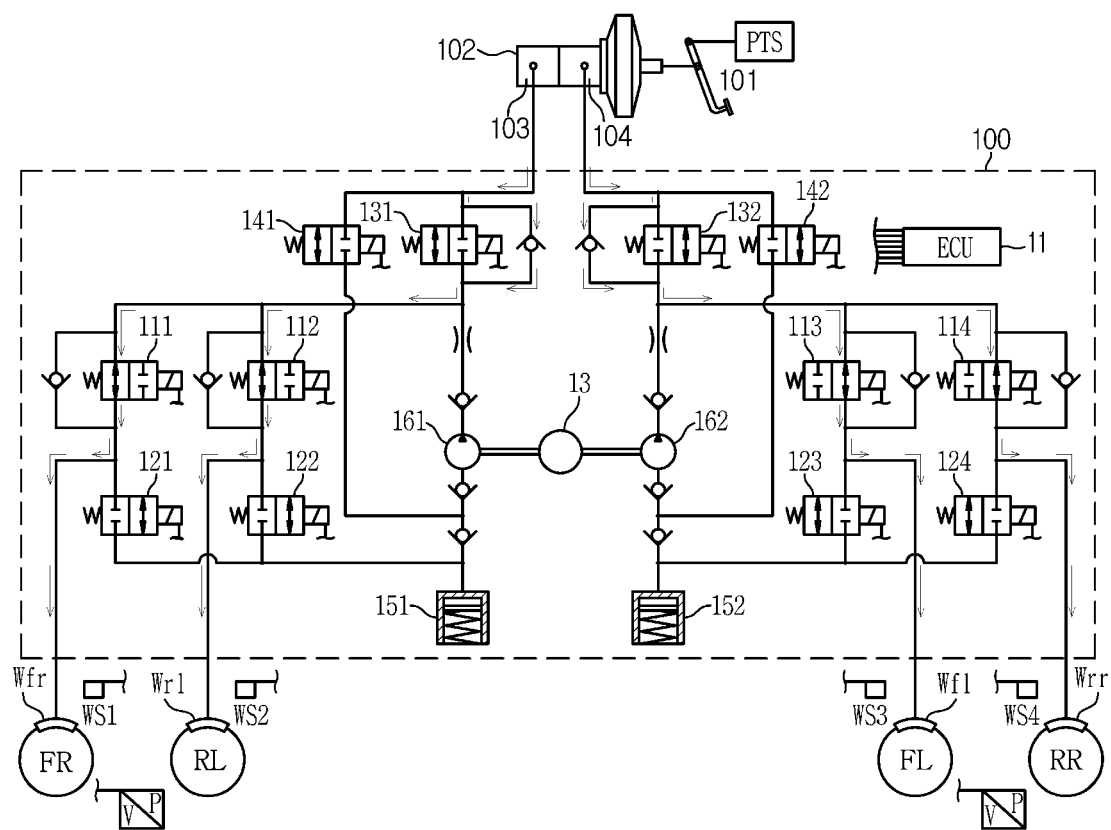
FIG. 5D is a hydraulic circuit diagram illustrating an operating state of a regenerative release mode of a brake system according to an exemplary embodiment.
Figure 6:
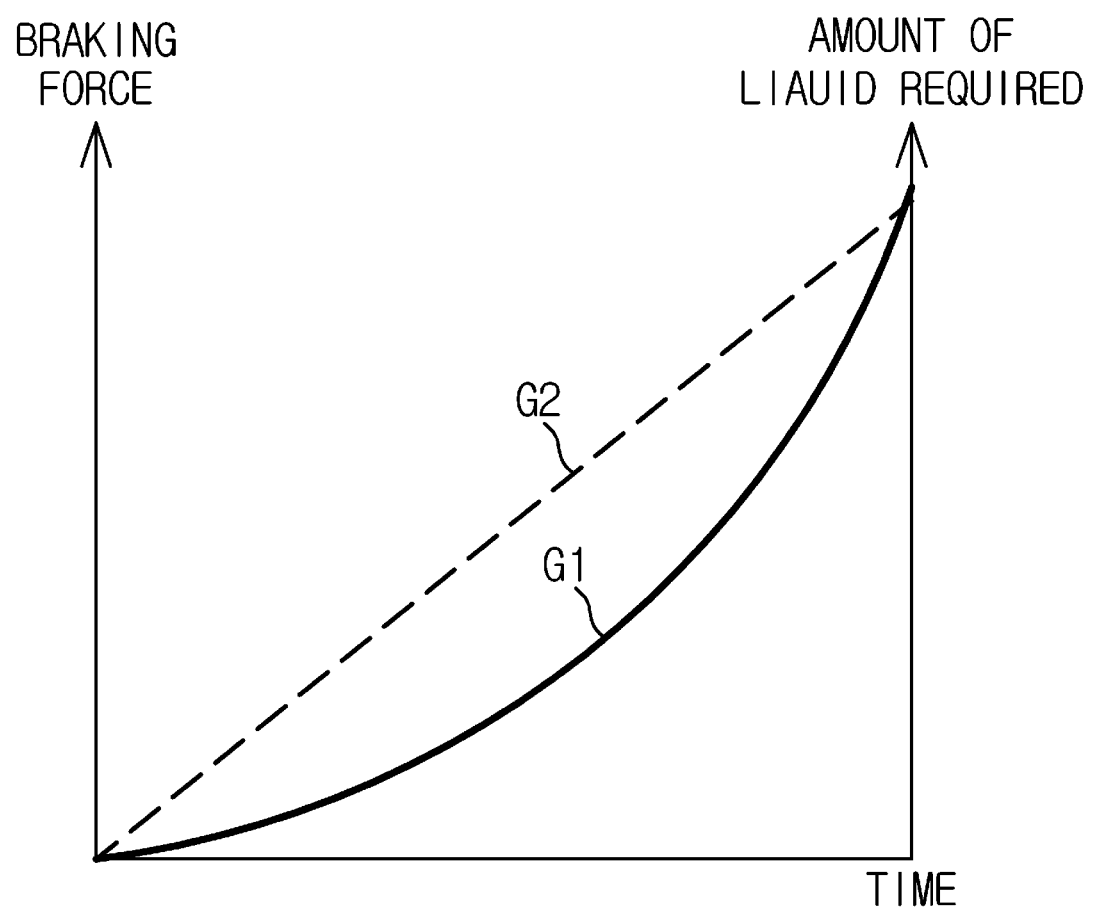
FIG. 6 is a graph illustrating a relationship between an amount of liquid required of a brake system and a braking force.

FIG. 3 is a graph illustrating a regenerative braking force and a hydraulic braking force during braking of a brake system according to an exemplary embodiment, FIG. 4 is a view illustrating the operation and state of a valve, a hydraulic pump, and a low pressure accumulator during braking of a brake system according to an embodiment, FIG. 5A is a hydraulic circuit diagram illustrating an operating state of a regenerative initial mode of a brake system according to an exemplary embodiment, FIG. 5B is a hydraulic circuit diagram illustrating an operating state of a regenerative cooperation mode of a brake system according to an exemplary embodiment. FIG. 5C is a hydraulic circuit diagram illustrating an operating state of a regenerative fadeout mode of a brake system according to an exemplary embodiment, FIG. 5D is a hydraulic circuit diagram illustrating an operating state of a regenerative release mode of a brake system according to an exemplary embodiment, and FIG. 6 is a graph illustrating a relationship between an amount of liquid required of a brake system and a braking force.

Referring to FIGS. 3 and 4, a regenerative braking mode is classified into a plurality of modes for each braking period.

It is assumed that the vehicle is decelerated by starting braking in a first braking period and then stopped in a fourth braking period through a second braking period and a third braking period.

A first braking period ① may be a period during which a regenerative initial mode is performed.

The regenerative initial mode may be a mode that generates the regenerative braking force without generating the hydraulic braking force at the beginning of braking.

The ECU 11 may perform the regenerative initial mode when a value corresponding to the driver's braking intent is greater than or equal to a predetermined value. In this case, entry into the regenerative initial mode may be performed regardless of the regenerative braking force. For example, regardless of a maximum regenerative braking force Rmax, when the value corresponding to the driver's braking intent is greater than or equal to a predetermined threshold value, the ECU 11 may enter the regenerative initial mode.

At this time, the ECU 11 may determine the value corresponding to the driver's braking intent through a displacement amount of the brake pedal 101. The ECU 11 may enter the regenerative initial mode when the displacement amount of the brake pedal 101 is greater than or equal to the predetermined threshold value.

In the regenerative initial mode, the ECU 11 may transmit a control signal to the regenerative braking device 20 such that the driver presses the brake pedal 10 to generate the regenerative braking force corresponding to the driver's required braking force.

Referring to FIG. 5A, in the regenerative initial mode, the pressurized medium discharged from the master cylinder 102 may be transmitted to the low pressure accumulators 151 and 152, and each of the wheel cylinders FR, RL, FL, and RR may perform braking of the vehicle only by the regenerative braking force of the electric motor 200.

Particularly, when the vehicle is braked, the ECU 11 may control the normal open traction control valves 131 and 132 to be maintained in an open state, and may control the normal open inlet valves 111, 112, 113, and 114 to be maintained in the open state, but may control the normal close outlet valves 121, 122, 123, and 124 to be switched to the open state.

Thus, the pressurized medium discharged from the master cylinder 102 may be transmitted to the low pressure accumulators 151 and 152 sequentially through the normal open traction control valves 131 and 132, the normal open inlet valves 111, 112, 113, and 114, the normal close outlet valves 121, 122, 123, and 124, and each of the wheel cylinders FR, RL, FL, and RR may decelerate the vehicle by performing the braking of the vehicle only by regenerative braking force of the electric motor 200.

At this time, the ECU 11 may control the hydraulic pumps 161 and 162 and the motor 13 to maintain a non-driven state. In addition, in the regenerative initial mode, the ECU 11 may control opening and closing of at least one valve or turning on or off at least one pump in order for the pressurized medium to be dumped to the low pressure accumulators 151 and 152.

As described above, in the regenerative initial mode, the ECU 11 may discharge the pressurized medium to the low pressure accumulators 151 and 152 by opening only the outlet valves 121, 122, 123, and 124 and turning off the hydraulic pumps 161 and 162 among the traction control valves 131 and 132, the inlet valves 111, 112, 113, and 114, and the outlet valves 121, 122, 123, and 124.

That is, in a first braking period ① in which the regenerative initial mode is performed, the ECU 11 may control each valve so that the normal open traction control valves 131 and 132 are in an off state, the normal open inlet valves 111, 112, 113, and 114 are in the off state, and the normal close outlet valves 121, 122, 123, and 124 are in an on state. In addition, the ECU 11 may control the hydraulic pumps 161 and 162 and the motor 13 to be in the off state.

On the other hand, the switching from the first braking period ① to a second braking period ② may be determined by the regenerative braking force. When the regenerative braking force corresponding to the driver's required braking force is less than the maximum regenerative braking force Rmax, that is, before the regenerative braking force corresponding to the driver's required braking force reaches the maximum regenerative braking force Rmax, the ECU 11 may switch the braking mode from regenerative initial mode to a regenerative cooperation mode. A detailed description thereof will be described later.

The second braking period ② and a third braking section ③ may be periods in which a mode for generating the hydraulic braking force and the regenerative braking force is performed according to the driver's required braking force.

The second braking period ② may be a period during which the regenerative cooperation mode is performed in which the total braking force, which is the sum of the regenerative braking force and the hydraulic braking force, reaches the driver's required braking force by generating the hydraulic braking force and the regenerative braking force together, but increasing the regenerative braking force to the maximum regenerative braking force, and initiating and increasing the occurrence of hydraulic braking force.

In the regenerative cooperation mode, the ECU 11 may control not only the regenerative braking force but also the hydraulic braking force to be generated when the driver's required braking force gradually increases as the amount of displacement of the brake pedal 101 increases.

Referring to FIG. 5B, during the regenerative cooperation mode is performed, i.e. during the second braking period ②, the normal open traction control valves 131 and 132 may maintain the open state, and the normal open inlet valves 111, 112, 113, and 114 may maintain the open state, but the normal close outlet valve 121, 122, 123, and 124 may be switched to the closed state. As a result, the pressurized medium discharged from the master cylinder 102 may be transmitted to each of the wheel cylinders FR, RL, FL, and RR sequentially through the normal open traction control valves 131 and 132 and the normal open inlet valves 111, 112, 113, and 114 to provide the hydraulic braking force, and at the same time, may decelerate the vehicle by performing braking of the vehicle by the regenerative braking force of the electric motor 200. In the regenerative cooperation mode, the hydraulic pumps 161 and 162 and the motor 13 may maintain in the non-driven state (off state).

In this case, the ECU 11 may generate the hydraulic braking force by supplying the pressurized medium of the master cylinder 102 to each of the wheel cylinders FR, RL, FL, and RR by closing only the outlet valves 121, 122, 123, and 124 among the inlet valves 111, 112, 113, and 114, the outlet valves 121, 122, 123, and 124, the traction control valves 131 and 132, and the hydraulic pumps 161 and 162

That is, in the second braking period ② operating in the regenerative cooperation mode, the ECU 11 may control each valve such that the normal open traction control valves 131 and 132, the normal open inlet valves 111, 112, 113 and 114, and the normal close outlet valve 121, 122, 123, and 124 are all turned off. In addition, the ECU 11 may control the hydraulic pumps 161 and 162 and the motor 13 to be in the off state.

On the other hand, in the general brake system, as illustrated in FIG. 6, as the driver presses the brake pedal 101, the amount of brake required may increase in a form of a first graph G1. At this time, the generated hydraulic braking force may increase in a form of a second graph G2. In other words, unlike the amount of brake required, which increases at a relatively constant level from the beginning of braking, the hydraulic braking force increases slowly at the beginning of braking and then gradually increase.

In this way, in the early stages of braking when the hydraulic braking force starts to generate, a significantly smaller amount of the hydraulic braking force is generated compared to the amount of brake required, so there is a difference between the driver's required braking force and the actual hydraulic braking force. Thus, there is a need to provide the regenerative braking force to compensate for the gap between the driver's required braking force and the hydraulic braking force that actually occurs.

To this end, the ECU 11 may control the magnitude of the regenerative braking force generated by the regenerative braking device 20 to be changed based on the required amount of pressurized medium.

Particularly, the ECU 11 may identify the hydraulic braking force corresponding to the amount of brake required determined based on the displacement amount of the brake pedal 101, and may determine a first target regenerative braking force based on the identified hydraulic braking force.

The ECU 11 may determine the braking force except for the hydraulic braking force identified in the total required braking force corresponding to the driver's required braking force as the first target regenerative braking force. The ECU 11 may control the regenerative braking as much as the first target regenerative braking force to be performed by transmitting the information about the determined first target regenerative braking force to the regenerative braking device 20.

Through this, the ECU 11 may compensate for a gap between the driver's required braking force and the hydraulic braking force that occurs actually by reflecting the amount of liquid of brake required through the regenerative braking force. The total braking force may be generated that matches the driver's required braking force, allowing for more efficient braking.

The third braking period ③ may be a period during which a regenerative fadeout mode is performed in which the total braking force, which is the sum of the regenerative braking force and the hydraulic braking force, reaches the driver's required braking force by generating the hydraulic braking force and the regenerative braking force together, but decreasing the regenerative braking force from the maximum regenerative braking force and increasing the hydraulic braking force in accordance with the driver's required braking force.

When the speed of the vehicle is less than or equal to the predetermined threshold value during the execution of the regenerative cooperation mode, the ECU 11 may perform the regenerative fadeout mode. That is, the switching from the regenerative cooperation mode to the regenerative fadeout mode may be performed when the speed of the vehicle is less than or equal to the predetermined threshold value.

When the speed of the vehicle is sufficiently decreased during the third braking period ③ and the efficiency of regenerative braking due to the conversion of electrical energy is low, the ECU 11 may decrease the regenerative braking force but increase the hydraulic braking force, thereby performing the regenerative fadeout mode.

Referring to FIG. 5C, during the regenerative fadeout mode is performed, i.e. during the third braking period ③, the normal open inlet valves 111, 112, 113, and 114 may maintain the open state, the normal close outlet valves 121, 122, 123, and 124 may maintain a closed state, but the normal open traction control valves 131 and 132 may be switched to the closed state. As a result, the pressurized medium discharged from the master cylinder 102 may be transmitted to each of the wheel cylinders FR, RL, FL, and RR sequentially through a check valve and the normal open inlet valves 111, 112, 113, and 114 to provide the hydraulic braking force, and at the same time, may decelerate the vehicle by performing braking of the vehicle by the regenerative braking force of the electric motor 200.

At this time, the regenerative braking force by the electric motor 200 may be gradually decreased, so that the ECU 11 may increase the hydraulic braking force to compensate for the decreased regenerative braking force so as to maintain the required braking force corresponding to the driver's braking intent.

Particularly, the ECU 11 may drive the motor 13 to pressurize the pressurized medium stored in the low pressure accumulators 151 and 152 by the hydraulic pumps 161 and 162 and provide the same to the normal open inlet valves 111, 112, 113, and 114. In this case, the ECU 11 may receive information about the decreased regenerative braking force from the regenerative braking device 20 and control the hydraulic braking force to increase by the amount of the regenerative braking force.

The ECU 11 may enter the regenerative fadeout mode when the speed of the vehicle is less than or equal to the predetermined threshold value, and may operate the hydraulic pumps 161 and 162 before stopping the vehicle to supply the pressurized medium stored in the low pressure accumulators 151 and 152 to each of the wheel cylinders FR, RL, FL, and RR, thereby increasing the hydraulic braking force by the decreased regenerative braking force.

To this end, the ECU 11 may open only the inlet valves 111, 112, 113, and 114 and operate the hydraulic pumps 161 and 162 to increase the hydraulic braking force among the inlet valves 111, 112, 113, and 114, the outlet valves 121, 122, 123, and 124, and the traction control valve 131 and 132.

That is, in the third braking period ③ operating in the regenerative fadeout mode, the ECU 11 may control each configuration such that the normal open inlet valves 111, 112, 113, and 114 and the normal close outlet valves 121, 122, 123, and 124 may be in the off state, and the normal open traction control valves 131 and 132, the hydraulic pumps 161 and 162, and the motor 13 may be in the on state.

In addition, in the regenerative fadeout mode, the ECU 11 may determine a second target regenerative braking force based on the increased hydraulic braking force, and may transmit information about the determined second target regenerative braking force to the regenerative braking device 20. As a result, the regenerative braking as much as the second target regenerative braking force may be performed.

In this case, the ECU 11 may determine the braking force except for the increased hydraulic braking force in the total required braking force corresponding to the driver's required braking force as the second target regenerative braking force. That is, the second target regenerative braking force determined in the third braking period ③ may have a smaller value than the first target regenerative braking force determined in the second braking period ②. As a result, the regenerative braking force in the third braking period ③ may decrease.

The fourth braking period ④ may be a period during which a regenerative release mode for stopping generation of the regenerative braking force and generating only the hydraulic braking force corresponding to the driver's required braking force is performed.

Referring to FIG. 5D, during the regenerative release mode is performed, i.e. during the fourth braking period ④, the normal open traction control valves 131 and 132 may maintain the closed state, the normal open inlet valves 111, 112, 113, and 114 may maintain the open state, and the normal close outlet valves 121, 122, 123, and 124 may maintain the closed state. As a result, the pressurized medium discharged from the master cylinder 102 may be transmitted to each of the wheel cylinders FR, RL, FL, and RR sequentially through the check valve and the normal open inlet valves 111, 112, 113, and 114 to provide only the hydraulic braking force. Through this, braking of the vehicle may be terminated and the vehicle may be stopped.

To this end, the ECU 11 may stop the generation of the regenerative braking force by transmitting the control signal for stopping the generation of the regenerative braking force to the regenerative braking device 20. In addition, the ECU 11 may maintain only the hydraulic braking force by controlling only the inlet valve 111, 112, 113, and 114 to maintain the open state and turning off the hydraulic pumps 161 and 162 among the inlet valve 111, 112, 113, and 114, the outlet valves 121, 122, 123, and 124, and the traction control valves 131 and 132.

That is, in the fourth braking period ④ operating in the regenerative release mode, the ECU 11 may control each configuration such that the normal open inlet valves 111, 112, 113, and 114, the normal close outlet valves 121, 122, 123, and 124, the hydraulic pumps 161 and 162, and the motor 13 may be in the off state, and the normal open traction control valves 131 and 132 may be in the on state.

On the other hand, the graph illustrated in FIG. 3 illustrates an ideal change of the regenerative braking force and hydraulic braking force during braking, the change of the regenerative braking force and hydraulic braking force during actual braking may not be represented as a graph having a linear, and may be represented as a graph having a shape.

Figure 7A:
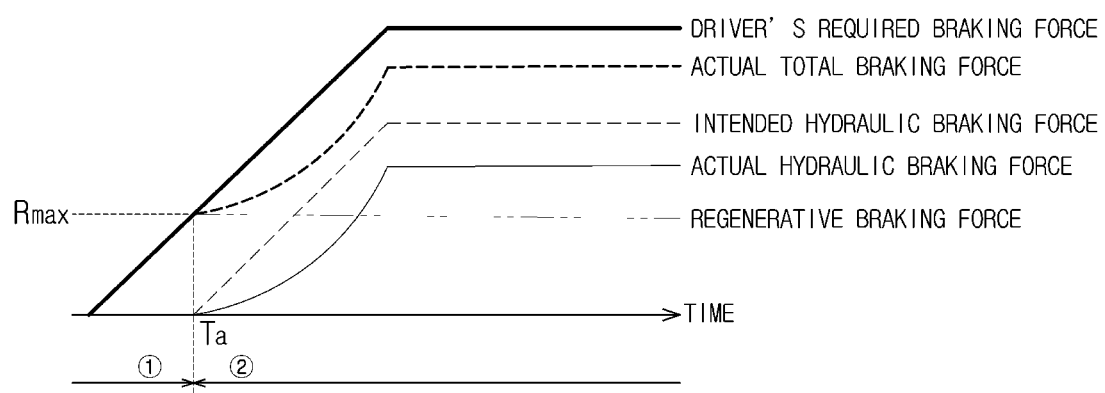
FIG. 7A is a graph illustrating a regenerative braking force and a hydraulic braking force during braking of a brake system according to an exemplary embodiment.
Figure 7B:
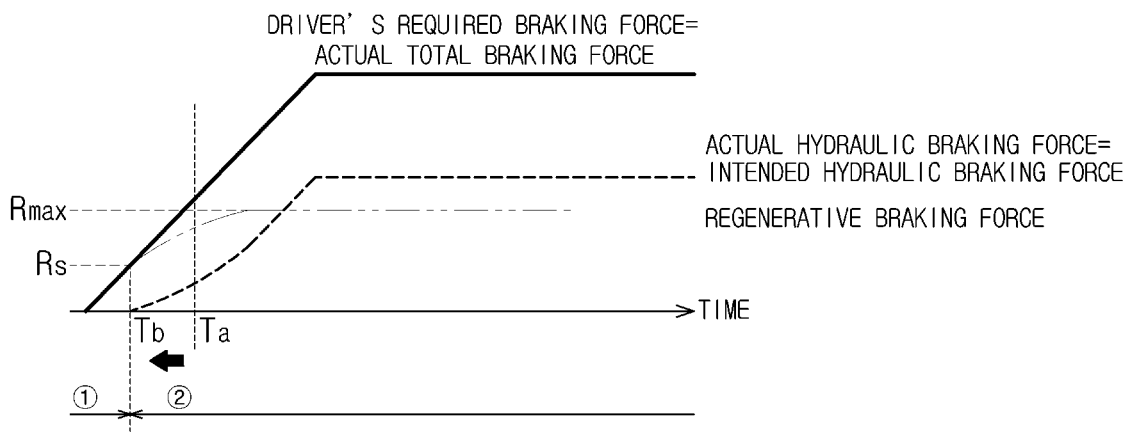
FIG. 7B is a graph illustrating a regenerative braking force and a hydraulic braking force during braking of a brake system according to another exemplary embodiment.

FIG. 7A is a graph illustrating a regenerative braking force and a hydraulic braking force during braking of a brake system according to an exemplary embodiment, and FIG. 7B is a graph illustrating a regenerative braking force and a hydraulic braking force during braking of a brake system according to another exemplary embodiment.

Referring to FIG. 7A, the brake system 1 may perform the regenerative initial mode at a time before a point Ta at which the regenerative braking force reaches the maximum regenerative braking force Rmax.

At this time, the ECU 11 may control on/off at least one of the at least one valve, the hydraulic pumps 151 and 152, and the motor 13 such that the pressurized medium discharged from the master cylinder 102 is stored in the low pressure accumulators 151 and 152. The detailed description thereof is the same as described above with reference to FIG. 3.

The ECU 11 may switch the regenerative initial mode to the regenerative cooperation mode when the regenerative braking force corresponding to the driver's required braking force reaches the maximum regenerative braking force Rmax (i.e., Ta time point). That is, when the regenerative braking force above the maximum regenerative braking force is required, the regenerative initial mode generating the regenerative braking force may be stopped and the regenerative cooperation mode generating the hydraulic braking force together may be executed.

In general, the greater the maximum regenerative braking force, the greater the difference between a driver's required torque and the regenerative braking torque of regenerative braking control according to the operation of the brake pedal 101. This is because the greater the maximum regenerative braking force, the greater the difference in liquid consumption.

In order to compensate for the difference between the driver's required torque and the regenerative braking torque of regenerative braking control, as illustrated in FIG. 7B, the brake system 1 according to another embodiment may advance the time point at which the regenerative cooperation mode is performed to a time point Tb before the time point Ta at which the regenerative braking force reaches the maximum regenerative braking force Rmax.

Particularly, the ECU 11 may determine a mode switching regenerative braking force Rs based on the maximum regenerative braking force Rmax, and may switch the braking mode from the regenerative initial mode to the regenerative cooperation mode at the time point Tb when the regenerative braking force corresponding to the driver's required braking force reaches the determined mode switching regenerative braking force Rs.

To this end, the ECU 11 may compare the regenerative braking force corresponding to the driver's required braking force with the maximum regenerative braking force Rmax of the regenerative braking device 20 in real time.

The ECU 11 may determine a value smaller than the maximum regenerative braking force Rmax as the mode switching regenerative braking force Rs. Particularly, the ECU 11 may determine a value obtained by applying a weight k to the maximum regenerative braking force Rmax as the mode switching regenerative braking force Rs, and the mode switching regenerative braking force Rs may be determined by Equation 1 below.

$$Rs = k * Rmax, \ 0 < k \leq 1 \qquad \text{[Equation 1]}$$

As such, the mode switching regenerative braking force Rs determined by Equation 1 may have the value smaller than the maximum regenerative braking force Rmax.

Through this, the ECU 11 may compensate for the difference between the driver's required torque and the regenerative braking torque of the regenerative braking control according to the operation of the brake pedal 101, and more efficient braking is possible.

In addition, at the time point of switching to the regenerative cooperation mode, that is, at the time point Tb at which the hydraulic braking force starts to be provided, the ECU 11 may control the regenerative braking force generated by the regenerative braking device 20 to be changed based on the actual hydraulic braking force. The ECU 11 may determine the braking force except for the hydraulic braking force identified in the total required braking force corresponding to the driver's required braking force as the first target regenerative braking force. The ECU 11 may control the regenerative braking as much as the first target regenerative braking force to be performed by transmitting information about the determined first target regenerative braking force to the regenerative braking device 20.

Meanwhile, the ECU 11 may determine the first target regenerative braking force in real time during the time point Ta at which the regenerative braking force reaches the maximum regenerative braking force Rmax at the time point Tb at which the hydraulic braking force starts to be provided. As a result, the ECU 11 may transmit the control signal to the regenerative braking device 20.

Through this, the ECU 11 may compensate for the gap between the driver's required braking force and the hydraulic braking force that actually occurs by reflecting the amount of liquid of brake required through the regenerative braking force. The total braking force may be generated that matches the driver's required braking force, allowing for more efficient braking.

Figure 8:
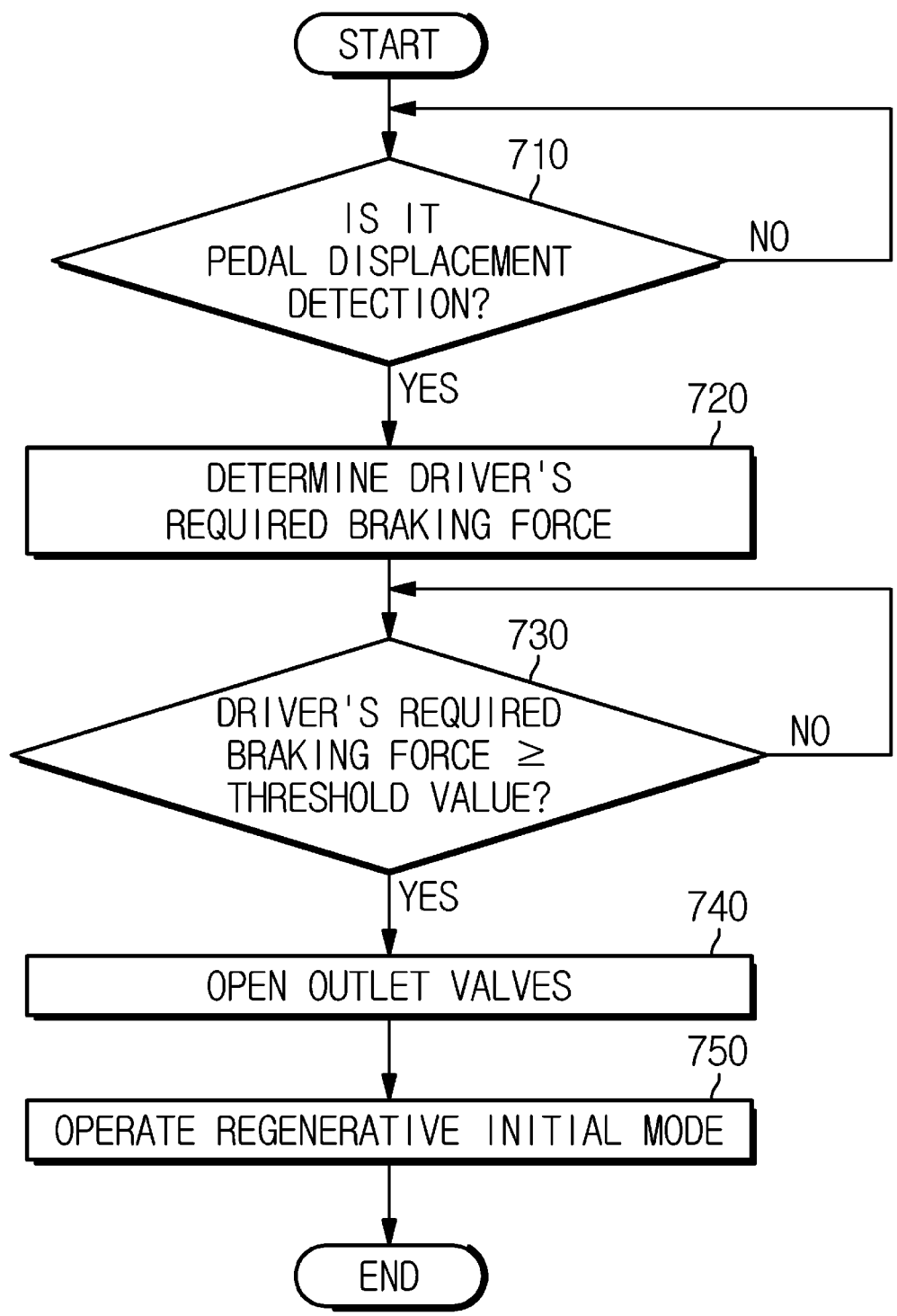
FIGS. 8 and 9 are flowcharts illustrating a regenerative braking method of a brake system according to an exemplary embodiment.

FIG. 8 is a flowchart illustrating a regenerative braking method of a brake system according to an exemplary embodiment.

Referring to FIG. 8, the ECU 11 according to an exemplary embodiment may determine whether a pedal displacement is detected (710), when the pedal displacement is detected (YES in 710), the ECU 11 may determine the driver's required braking force based on the detected pedal displacement (720).

The ECU 11 may identify whether the driver's required braking force is greater than or equal to the predetermined threshold value (730). When the driver's required braking force is greater than or equal to the predetermined threshold value (730), the ECU 11 may open the outlet valves 121, 122, 123, and 124 (740) and may operate in the regenerative initial mode (750).

In this case, the predetermined threshold value may be a value set regardless of the maximum regenerative braking force Rmax. That is, the entry into the regenerative initial mode may be performed when the value corresponding to driver's braking intent is greater than or equal to the predetermined threshold value regardless of the maximum regenerative braking force.

At this time, the ECU 11 may determine the value corresponding to the driver's braking intent through the displacement amount of the brake pedal 101. The ECU 11 may enter the regenerative initial mode when the displacement amount of the brake pedal 101 is greater than or equal to the predetermined threshold value. In addition, the outlet valves 121, 122, 123, and 124 are normal close outlet valves, and the ECU 11 may open the outlet valves 121, 122, 123, and 124 by controlling the outlet valves 121, 122, 123, and 124 to be in the on state.

Figure 9:
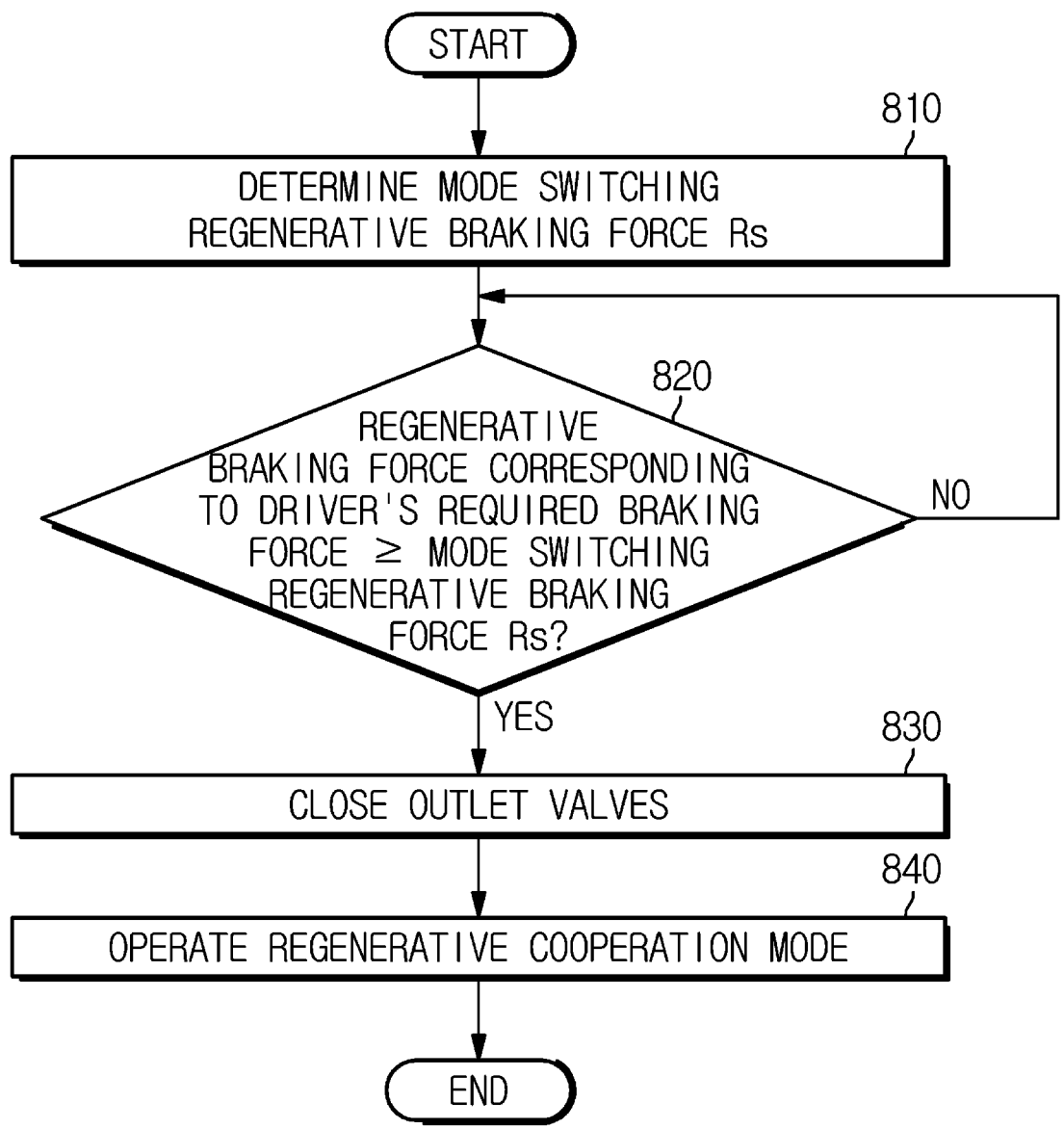

FIG. 9 is a flowchart illustrating a regenerative braking method of a brake system according to an exemplary embodiment.

Referring to FIG. 9, the ECU 11 according to an exemplary embodiment may determine the mode switching regenerative braking force Rs (810). At this time, the mode switching regenerative braking force Rs may refer to the regenerative braking force which is a reference for switching from the regenerative initial mode to the regenerative cooperation mode, and may have the value smaller than the maximum regenerative braking force Rmax.

Particularly, the ECU 11 may determine the value obtained by applying the weight k to the maximum regenerative braking force Rmax as the mode switching regenerative braking force Rs, and the mode switching regenerative braking force Rs may be determined the above-described [Equation 1].

The ECU 11 may identify whether the regenerative braking force corresponding to the driver's required braking force has the value greater than the mode switching regenerative braking force Rs (820).

When the regenerative braking force corresponding to the driver's required braking force has the value greater than the mode switching regenerative braking force Rs, the ECU 11 may close the normal close outlet valves 121, 122, 123, and 124 (830). Thereafter, the ECU 11 may operate in the regenerative cooperation mode (840). That is, the ECU 11 may switch the braking mode from the regenerative initial mode to the regenerative cooperation mode when the regenerative braking force corresponding to the driver's required braking force becomes greater than the mode switching regenerative braking force Rs.

Through this, the ECU 11 according to an exemplary embodiment may switch to the regenerative cooperation mode before the regenerative braking force corresponding to the driver's required braking force reaches the maximum regenerative braking force, thereby preventing the braking force from being decreased due to the difference in the required liquid amount.

As described above, the regenerative braking may be performed even in the vehicle to which the hydraulic braking device is applied, and the hydraulic braking force loss due to the difference in the amount of liquid compared to the electronic braking device of the hydraulic braking device may be compensated by the regenerative braking force, so that the total braking force may improve. Therefore, the user's convenience and driving safety may be increased.

The exemplary embodiments of the present disclosure have thus far been described with reference to the accompanying drawings. It will be obvious to people of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

The invention claimed is:

1. A brake system comprising:
a hydraulic braking device configured to generate a hydraulic braking force,
wherein the hydraulic braking device comprises:
a master cylinder configured to generate a hydraulic pressure corresponding to a displacement amount of a brake pedal by discharging a brake oil;
a plurality of valves disposed in a flow path connecting a plurality of wheel cylinders and the master cylinder;
an accumulator disposed in the flow path; and
an electronic control unit (ECU) configured to determine a required braking force corresponding to the displacement amount of the brake pedal, and to control the plurality of valves,
wherein
in response to the displacement amount of the brake pedal being detected, the ECU is configured to control the plurality of valves so that the brake oil discharged from the master cylinder is stored in the accumulator, and to transmit a request signal for generating a regenerative braking force to a regenerative braking device configured to generate the regenerative braking force by an electric motor,
the plurality of valves comprise a plurality of outlet valves each disposed on an outlet side of a corresponding wheel cylinder of the plurality of wheel cylinders,
the ECU is configured to store the brake oil discharged from the master cylinder in the accumulator by switching the plurality of outlet valves to an open state,
the ECU is configured to switch the plurality of outlet valves from the open state to a closed state at a first time point before a second time point at which the regenerative braking force corresponding to the required braking force reaches a maximum regenerative braking force, and
the ECU is configured to
determine a mode switching regenerative braking force that is less than the maximum regenerative braking force,
in response to the regenerative braking force corresponding to the required braking force reaching the determined mode switching regenerative braking force, switch the plurality of outlet valves to the closed state at the first time point, and increase the regenerative braking force at the first time point which the plurality of outlet valves are switched from the open state to the closed state to reach the maximum regenerative braking force at the second time point.

2. The brake system according to claim 1, wherein the ECU is configured to control the plurality of valves such that the brake oil stored in the accumulator is transmitted to the plurality of wheel cylinders in response to a vehicle speed being equal to or less than a predetermined reference value.

3. The brake system according to claim 2, wherein the plurality of valves comprise a traction control valve disposed between the master cylinder and the wheel cylinders, and
wherein the ECU is configured to transmit the brake oil stored in the accumulator to the plurality of wheel cylinders by switching the traction control valve to a closed state.

4. The brake system according to claim 2, further comprising:
a hydraulic pump configured to provide the brake oil stored in the accumulator to the plurality of wheel cylinders; and
a motor configured to drive the hydraulic pump,
wherein the ECU is configured to transmit the brake oil stored in the accumulator to the plurality of wheel cylinders by turning on the hydraulic pump and the motor.

5. The brake system according to claim 1, wherein the ECU is configured to switch the plurality of outlet valves to the open state in response to the displacement amount of the brake pedal being greater than or equal to a predetermined threshold value.

6. The brake system according to claim 1, wherein the ECU is configured to determine a value obtained by applying a predetermined weight to the maximum regenerative braking force as the mode switching regenerative braking force, and
wherein the predetermined weight is greater than 0 and less than 1.

7. The brake system according to claim 1, wherein the ECU is configured to determine a target regenerative braking force based on the required braking force, and to transmit the request signal to the regenerative braking device such that the determined target regenerative braking force is generated.

8. The brake system according to claim 7, wherein the ECU is configured to determine a braking force obtained by subtracting the hydraulic braking force from the required braking force as the target regenerative braking force.

9. A brake system comprising:
a hydraulic braking device configured to generate a hydraulic braking force,
wherein the hydraulic braking device comprises:
a master cylinder configured to generate a hydraulic pressure corresponding to a displacement amount of a brake pedal by discharging a brake oil;
a plurality of outlet valves each provided on an outlet side of a corresponding wheel cylinder of a plurality of wheel cylinders;
an inlet valve provided on an inlet side of the corresponding wheel cylinder of the plurality of wheel cylinders;
a traction control valve provided between the inlet valve and the master cylinder;
an accumulator connected to the plurality of outlet valves; and
an electronic control unit (ECU) configured to determine a required braking force corresponding to the displacement amount of the brake pedal, and to control a plurality of valves including the inlet valve, the plurality of outlet valves, and the traction control valve,
wherein
in response to the displacement amount of the brake pedal being detected, the ECU is configured to control the plurality of outlet valves so that the brake oil discharged from the master cylinder is stored in the accumulator, and to control the traction control valve such that the brake oil stored in the accumulator is transmitted to the plurality of wheel cylinders in response to a vehicle speed being equal to or less than a predetermined reference value,
the ECU is configured to store the brake oil discharged from the master cylinder in the accumulator by switching the plurality of outlet valves to an open state,
the ECU is configured to switch the plurality of outlet valves from the open state to a closed state at a first time point before a second time point at which the regenerative braking force corresponding to the required braking force reaches a maximum regenerative braking force, and
the ECU is configured to
determine a mode switching regenerative braking force that is less than the maximum regenerative braking force,
in response to the regenerative braking force corresponding to the required braking force reaching the determined mode switching regenerative braking force, switch the plurality of outlet valves to the closed state at the first time point, and
increase the regenerative braking force at the first time point which the plurality of outlet valves are switched from the open state to the closed state to reach the maximum regenerative braking force at the second time point.

10. The brake system according to claim 9, wherein the ECU is configured to transmit the brake oil stored in the accumulator to the plurality of wheel cylinders by switching the traction control valve to a closed state in response to the vehicle speed being equal to or less than the predetermined reference value.

11. The brake system according to claim 9, wherein the ECU is configured to switch the plurality of outlet valves to an open state when the displacement amount of the brake pedal is greater than or equal to a predetermined threshold value.

12. The brake system according to claim 9, wherein the ECU is configured to determine a target regenerative braking force based on the required braking force, and to transmit the request signal to a regenerative braking device such that the determined target regenerative braking force is generated.

* * * * *